(12) United States Patent
Steffen et al.

(10) Patent No.: US 8,991,363 B2
(45) Date of Patent: Mar. 31, 2015

(54) DUAL FUEL SYSTEM DIAGNOSTICS FOR DUAL FUEL ENGINE AND MACHINE USING SAME

(75) Inventors: Joshua W. Steffen, El Paso, IL (US); Dana R. Coldren, Secor, IL (US); Alan R. Stockner, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 276 days.

(21) Appl. No.: 13/590,518

(22) Filed: Aug. 21, 2012

(65) Prior Publication Data

US 2014/0053800 A1    Feb. 27, 2014

(51) Int. Cl.
| | |
|---|---|
| *F02M 43/02* | (2006.01) |
| *F02D 19/02* | (2006.01) |
| *F02D 41/00* | (2006.01) |
| *F02M 43/00* | (2006.01) |

(52) U.S. Cl.
CPC .......... *F02D 19/025* (2013.01); *F02D 41/0027* (2013.01)
USPC .......................................... 123/525; 123/575

(58) Field of Classification Search
CPC ........................... F02D 41/0027; F02D 19/025
USPC .............. 123/304, 525, 526, 527, 27 GE, 575
See application file for complete search history.

(56) References Cited

U.S. PATENT DOCUMENTS

| | | | |
|---|---|---|---|
| 3,413,840 A | 12/1968 | Basile et al. | |
| 4,404,843 A | 9/1983 | Johnson et al. | |
| 4,796,676 A | 1/1989 | Hendershot et al. | |
| 5,632,250 A * | 5/1997 | Kato et al. | 123/490 |
| 6,082,337 A | 7/2000 | Fujimoto et al. | |
| 6,460,518 B1 | 10/2002 | Streib | |
| 7,913,496 B2 | 3/2011 | Batenburg et al. | |
| 2007/0199539 A1* | 8/2007 | Lennox et al. | 123/304 |
| 2009/0088983 A1* | 4/2009 | Bauer et al. | 702/24 |
| 2011/0005303 A1 | 1/2011 | Izumo et al. | |

FOREIGN PATENT DOCUMENTS

DE    4218890    12/1993

* cited by examiner

*Primary Examiner* — Mahmoud Gimie
(74) *Attorney, Agent, or Firm* — Liell & McNeil Attorneys, PC

(57) ABSTRACT

A machine includes a machine body and a dual fuel compression ignition engine attached to the machine body. A dual fuel system is operably coupled to supply the engine with liquid diesel fuel and natural gas fuel directly into respective cylinders of the engine. The fuel system includes an insulated tank for storing the natural gas fuel, a pressure sensor positioned to measure fluid pressure within the tank, and a pump for drawing the natural gas fuel from the tank. An electronic controller is in communication with the pressure sensor and has a cryogenic system diagnostics algorithm executable thereon that is configured to receive a pressure signal from the pressure sensor, detect a cryogenic system fault based on the signal, and generate a notification signal based on the fault.

15 Claims, 3 Drawing Sheets

DUAL FUEL SYSTEM DIAGNOSTICS FOR DUAL FUEL ENGINE AND MACHINE USING SAME

TECHNICAL FIELD

The present disclosure relates generally to diagnostics for a fuel system for a dual fuel engine, and more particularly to diagnostics based on fuel tank pressure.

BACKGROUND

The burning of petroleum-based fuels, such as diesel fuel, is known to contribute to poor air quality. As a result, efforts have been undertaken to develop engines, and their associated machines, that can operate using alternative fuels. Such alternative fuels, which may burn cleaner than petroleum-based fuels, may include, for example, natural gas, propane, methanol, ethanol, hydrogen, and biodiesel. Some development efforts have focused on providing cost-effective and reliable alternatives to petroleum-based fuels, while also utilizing the performance and efficiency advantages of compression ignition engines. Thus, one such alternative strategy includes configuring a compression ignition engine to operate using both diesel fuel and natural gas fuel. For example, small amounts of diesel fuel may be used to compression ignite the combined diesel fuel and natural gas fuel.

Natural gas fuel may be stored onboard the machine in a liquefied state in order to achieve a higher storage density. However, the use of such a cryogenic fuel requires the use of specialized equipment, including a cryogenic tank for storing the liquefied natural gas fuel and a cryogenic pump for withdrawing and pressurizing the liquefied natural gas fuel. These components, the performance of which can be critical to engine operation, are susceptible to problems that may gradually become worse over time. Therefore, it may be desirable to repair or replace damaged components soon after the problem is detected, and before the problem progresses to component failure and renders the engine and machine inoperable. However, detecting the problem early is a significant challenge.

An exemplary diagnostics method for diagnosing cryogenic pump performance is provided in U.S. Pat. No. 7,913,496 to Batenburg et al. In particular, the Batenburg et al. reference teaches the use of a pressure sensor positioned downstream from the cryogenic pump along a delivery conduit between the cryogenic pump and an engine fuel injector. More specifically, the pressure sensor is positioned downstream from a heater, which changes the liquefied natural gas into a gaseous state, and upstream from an accumulator, which stores the natural gas in the gaseous state. An electronic controller is configured to receive a pressure signal from the pressure sensor and determine whether cryogenic pump performance has degraded by comparing the measured rate of fluid pressure increase to typical fluid pressure increases along the delivery conduit. Specifically, a problem with the cryogenic pump may be indicated if the measured rate of fluid pressure increase is lower than expected. Thus, while the art recognizes a need to diagnose cryogenic pump problems, there is a continuing need to provide cost-effective and reliable means for diagnosing problems with cryogenic fuel system components.

The present disclosure is directed to one or more of the problems or issues set forth above.

SUMMARY OF THE DISCLOSURE

In one aspect, a machine includes a machine body and a dual fuel compression ignition engine, which includes a plurality of cylinders, attached to the machine body. A dual fuel system is operably coupled to supply the dual fuel compression ignition engine with liquid diesel fuel and natural gas fuel directly into a respective one of the plurality of cylinders. The dual fuel system includes an insulated tank for storing the natural gas fuel in a liquefied state, a pressure sensor positioned to measure fluid pressure within the insulated tank, and a pump for drawing the natural gas fuel from the insulated tank. An electronic controller is in communication with the pressure sensor and has a cryogenic system diagnostics algorithm executable thereon. The cryogenic system diagnostics algorithm is configured to receive a pressure signal from the pressure sensor, detect a cryogenic system fault based on the pressure signal, and generate a notification signal based on the cryogenic system fault.

In another aspect, a method of operating a machine is provided. The machine includes a machine body and a dual fuel compression ignition engine attached to the machine body. A dual fuel system is operably coupled with the dual fuel compression ignition engine and includes an insulated tank for storing natural gas fuel in a liquefied state, a pressure sensor positioned to measure fluid pressure within the insulated tank, and a pump. An electronic controller is in communication with the pressure sensor and has a cryogenic system diagnostics algorithm executable thereon. The method includes steps of drawing the natural gas fuel from the insulated tank using the pump, and supplying the dual fuel compression ignition engine with liquid diesel fuel and the natural gas fuel directly into a respective one of a plurality of cylinders of the dual fuel compression ignition engine. The method also includes a step of executing the cryogenic system diagnostics algorithm, which includes receiving a pressure signal from the pressure sensor, detecting a cryogenic system fault based on the pressure signal, and generating a notification signal based on the cryogenic system fault.

DETAILED DESCRIPTION

Figure 1:
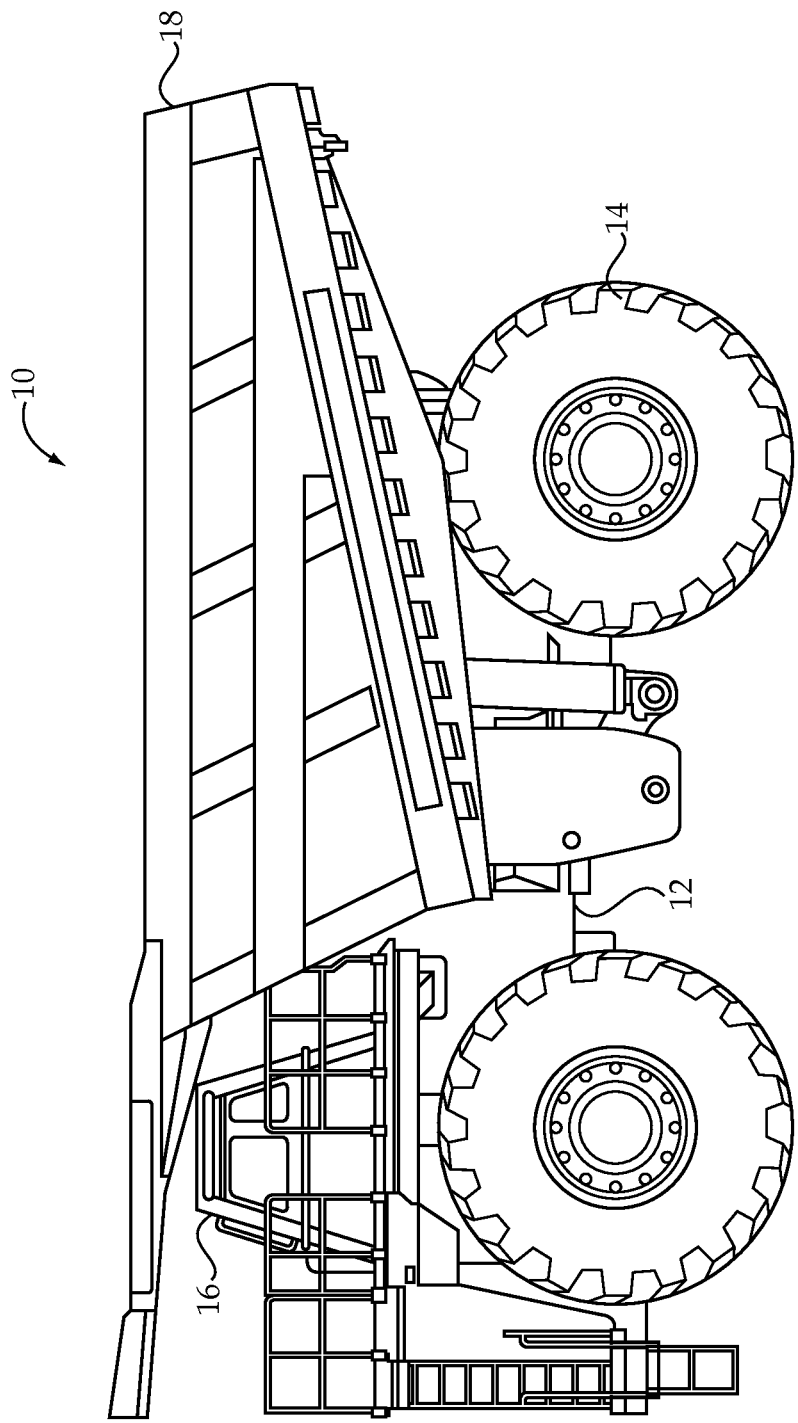
FIG. 1 is a side diagrammatic view of a machine, according to the present disclosure.

An exemplary embodiment of a machine 10, according to the present disclosure, is shown generally in FIG. 1. The machine 10 may be a mining truck, as shown, or may include any off-highway or on-highway vehicle having a dual fuel engine, as described herein. The machine 10 generally includes a machine body 12 supported by a conveyance 14, which may include wheels (as shown) or alternative ground-engaging propulsion elements. The machine 10 may also include an operator control station 16, including a variety of operator controls and displays useful for operating the machine 10, and a dump body 18, which may be pivotable relative to other portions of the machine body 12.

Figure 2:
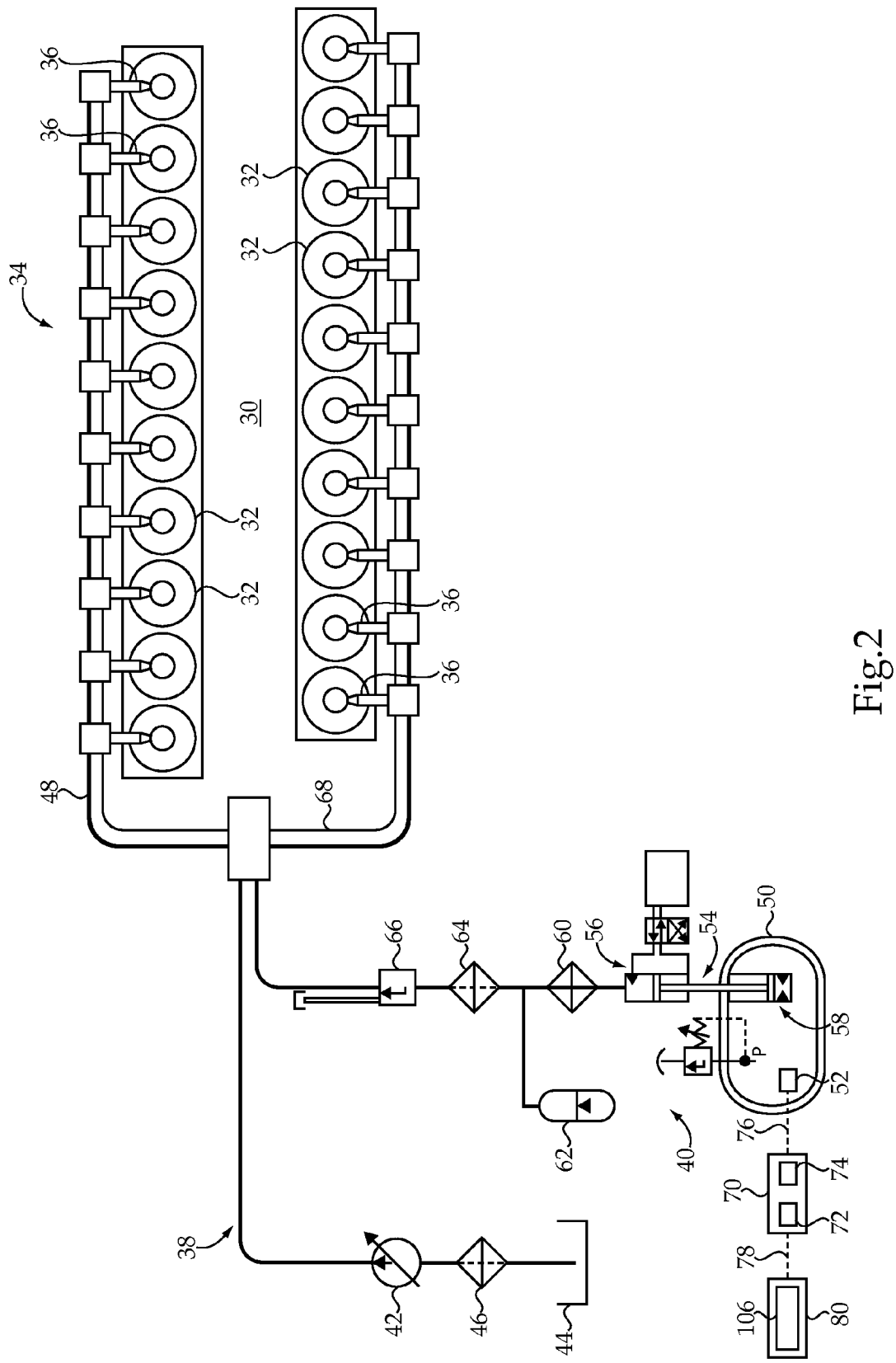
FIG. 2 is a schematic view of a dual fuel engine for powering the machine of FIG. 1, according to an exemplary embodiment.

Referring also to FIG. 2, a dual fuel compression ignition engine 30, which may provide power for the machine 10, is shown. As should be appreciated, the dual fuel compression ignition engine 30 may be attached to the machine body 12 and may be operably coupled to the conveyance 14. In particular, the dual fuel compression ignition engine 30 may provide propulsion power for the conveyance 14 and may also power a variety of other machine systems, including various mechanical, electrical, and hydraulic systems and/or components. In the illustrated example, dual fuel compression ignition engine 30 has a plurality of cylinders 32. A dual fuel system 34 may be operably coupled to supply the dual fuel compression ignition engine 30 with liquid diesel fuel and natural gas fuel from a single fuel injector 36 directly into a respective one of the cylinders 32. In other words, each cylinder 32 includes exactly one fuel injector 36 for injecting both liquid diesel fuel and natural gas fuel directly into the respective one of the engine cylinders 32.

The dual fuel system 34 may include a diesel fuel supply system 38 and a natural gas fuel supply system 40 that are carried on the machine body 12. The diesel fuel supply system 38 may include a high-pressure pump 42 that draws low-pressure liquid diesel fuel from a tank 44 through a filter 46. An outlet of the high-pressure pump 42 supplies liquid diesel fuel to, and controls pressure in, a liquid fuel common rail 48. Liquid fuel common rail 48 is, in turn, fluidly connected to each individual fuel injector 36 in a known manner.

The natural gas fuel supply system 40 may include an insulated tank 50, such as a vacuum insulated tank, also referred to as a cryogenic tank, for storing the natural gas fuel in a liquefied state. A pressure sensor 52 is positioned to measure fluid pressure within the insulated tank 50 and, as such, may be positioned at least partially within the insulated tank 50. A high-pressure pump 54, which is also referred to as a cryogenic pump, is positioned at least partially within the insulated tank 50 for drawing the natural gas fuel from the insulated tank 50. For example, the high-pressure pump 54 may include a warm end 56 positioned outside the insulated tank 50 and including a hydraulically driven motor assembly portion of the high-pressure pump 54, and a cold end 58 positioned inside the insulated tank 50 and including a pump assembly through which the liquefied natural gas fuel passes and is elevated in pressure.

The high-pressure pump 54 pumps the liquefied natural gas fuel from the insulated tank 50 to a heat exchanger 60. The heat exchanger 60 transfers heat into the liquefied natural gas fuel to change, or vaporize, the liquefied natural gas fuel into a gaseous state. Under pressure of the high-pressure pump 54, natural gas fuel in the gaseous state is transferred from the heat exchanger 60 to an accumulator 62, or other reservoir. The gaseous natural gas fuel may also pass through a high-pressure gas filter 64 before passing through a fuel conditioning module 66 and into a gaseous fuel common rail 68. The gaseous fuel common rail 68 is also fluidly connected to the individual fuel injectors 36 in a known manner. It should be appreciated that the dual fuel compression ignition engine 30 and dual fuel system 34 may include additional and/or alternative components and configurations, depending on a particular application. The particular embodiments described herein are provided for exemplary purposes only.

An electronic controller 70, which may be part of a machine control system, is in communication with the pressure sensor 52, among other components, and has a cryogenic system diagnostics algorithm, which will be described below, executable thereon. The electronic controller 70 may be of standard design and may include a processor 72, such as, for example, a central processing unit, a memory 74, and an input/output circuit that facilitates communication internal and external to the electronic controller 70. The processor 72 may control operation of the electronic controller 70 by executing operating instructions, such as, for example, computer readable program code stored in the memory 74, wherein operations may be initiated internally or externally to the electronic controller 70.

A control scheme, an example of which is provided below, may be utilized that monitors outputs of systems or devices, such as, for example, sensors, actuators, or control units, via the input/output circuit and controls inputs to various other systems or devices. For example, and as will be described below, the electronic controller 70 may receive a pressure signal 76 from the pressure sensor 52, perform operations responsive to receipt of the pressure signal 76, and generate a notification signal 78, which may be received at an operator display 80. The operations performed responsive to receipt of the pressure signal 76 may correspond to the cryogenic system diagnostics algorithm stored in memory 74 and may utilize additional information stored in memory 74. The memory 74 may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices.

Figure 3:
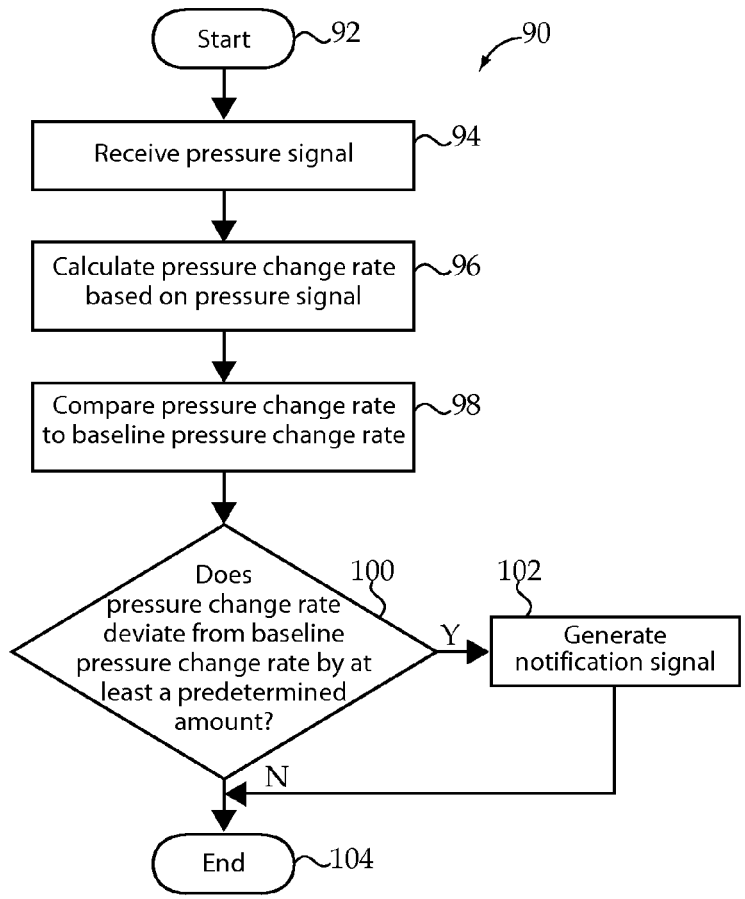
FIG. 3 is a logic flow diagram of a cryogenic system diagnostic algorithm that may be operated on an electronic controller of the machine of FIG. 1, according to another aspect of the present disclosure.

Turning to FIG. 3, there is shown a cryogenic system diagnostics algorithm 90 according to the present disclosure. The cryogenic system diagnostics algorithm 90 may be implemented by a control system of the machine 10. According to one example, the steps implementing the disclosed cryogenic system diagnostics algorithm 90 may be in the form of computer readable program code stored in the memory 74 and executed by the processor 72 of the electronic controller 70, or other computer usable medium. The method may run continuously or may be initiated in response to a predetermined event.

The method begins at a START, Box 92. From Box 92, the method proceeds to Box 94, which includes the electronic controller 70 receiving the pressure signal 76, or other similar electronic data, indicative of fluid pressure from the pressure sensor 52. The electronic controller 70 is configured to detect a cryogenic system fault, or problem, based on the pressure signal 76. In particular, as shown at Box 96, the electronic controller 70 may calculate a pressure change rate based on the pressure signal 76. In particular, by monitoring the pressure signal 76 over time, the electronic controller 70 may measure and/or record the change in fluid pressure within the insulated tank 50. This pressure change rate, according to the exemplary embodiment, may represent a pressure increase rate. In particular, it should be appreciated that the fluid pressure within the insulated tank 50 may gradually increase in temperature and, thus, pressure over time. However, if a problem with the dual fuel system 34 exists, the temperature and pressure may increase more rapidly.

At Box 98, the electronic controller 70 may compare the pressure change rate to a baseline pressure change rate, which may be stored in the memory 74. The baseline pressure change rate may be provided by the manufacturer or may be otherwise provided on memory 74. Alternatively, the electronic controller 70 may be configured to calculate and store the baseline pressure change rate. At Box 100, the electronic controller 70 determines whether the pressure change rate deviates from the baseline pressure change rate by at least a predetermined amount. If the pressure change rate does deviate from the baseline pressure change rate by an amount deemed significant, the cryogenic system diagnostic algorithm 90 proceeds to Box 102 and the electronic controller 70 generates the notification signal 78. If the pressure change rate is within a tolerated deviation from the baseline pressure change rate, the method proceeds to an END, at Box 104.

According to some embodiments, the cryogenic system diagnostics algorithm 90 may be configured to adjust at least one of the pressure change rate and the baseline pressure change rate based on a load factor value. For example, a significant change in load factor may result in a deviation of the pressure change rate that is not within the tolerated deviation from the baseline pressure change rate. However, such a deviation may not be indicative of a problem. As such, it may be desirable to adjust one or both of the pressure change rate and the baseline pressure change rate to compensate for at least some changes in load factor. Additional engine operating conditions may be accounted for by the cryogenic system diagnostics algorithm 90 to improve the accuracy of the diagnostics provided.

A user notification 106, such as a notification presented on operator display 80 of FIG. 2, that indicates a problem with the high-pressure pump 54 may be generated responsive to the notification signal 78. In particular, a greater than expected increase in fluid pressure within the insulated tank 50 may indicate a problem with the high-pressure pump 54. For example, if one of the pump seals leaks, pressurized natural gas fuel withdrawn from the insulated tank 50 into the cold end 58 of the high-pressure pump 54 may leak back into the insulated tank 50. This pressurized natural gas fuel will cause the temperature of the natural gas fuel within the insulated tank 50 to rise, thus causing an unexpected increase in fluid pressure. A similar unanticipated increase in fluid pressure may occur if the insulated tank 50 begins to lose vacuum. Thus, the user notification 106, which may be displayed in the operator control station 16 via the operator display 80, may indicate a problem with either or both of the high-pressure pump 54 and the insulated tank 50.

Figure 4:
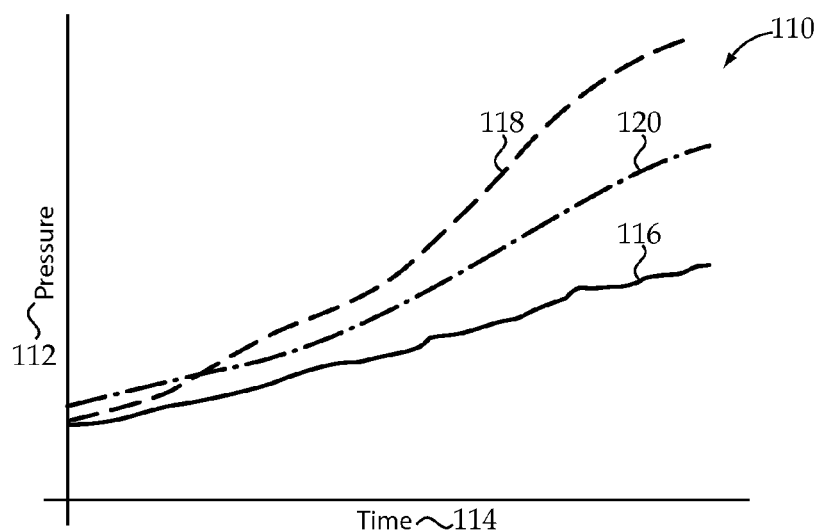
FIG. 4 is a graph illustrating pressure change over time and depicting exemplary pressure change rates, as referenced by the cryogenic system diagnostic algorithm of FIG. 3.

Turning now to FIG. 4, a graph 110 illustrating pressure change 112 over time 114 is shown. Depicted on the graph 110 are an exemplary baseline pressure change rate 116 and a pressure change rate 118, which may be calculated based on the pressure signal 76 received from the pressure sensor 52. The baseline pressure change rate 116, which may be based on previous or current data, may be relatively gradual, as shown. The pressure change rate 118 based on pressure sensor data and indicative of pressure changes within the insulated tank 50 may be outside of an acceptable deviation 120 from the baseline pressure change rate 116. As such, it may be desirable to send a notification warning of a potential dual fuel system problem, as described above.

INDUSTRIAL APPLICABILITY

The present disclosure is generally applicable to any machine that utilizes a dual fuel compression ignition engine. Further, the present disclosure finds particular applicability to machines, such as mining trucks, having a dual fuel system for providing liquid diesel fuel and natural gas fuel to the dual fuel compression ignition engine. The present disclosure also finds general applicability to diagnostics for the dual fuel system. In particular, the present disclosure may be applicable to strategies for detecting problems with components of the dual fuel system.

Referring generally to FIGS. 1-4, a dual fuel compression ignition engine 30 may be attached to a machine body 12 of a machine 10 and may be operably coupled to a conveyance 14. A dual fuel system 34 may be operably coupled to supply the dual fuel compression ignition engine 30 with liquid diesel fuel and natural gas fuel from a single fuel injector 36 directly into a respective one of a plurality of engine cylinders 32. The dual fuel system 34 may include a diesel fuel supply system 38 and a natural gas fuel supply system 40 that are carried on the machine body 12. The diesel fuel supply system 38 may include a high-pressure pump 42 that draws low-pressure liquid diesel fuel from a tank 44 through a filter 46. An outlet of the high-pressure pump 42 supplies liquid diesel fuel to, and controls pressure in, a liquid fuel common rail 48. Liquid fuel common rail 48 is, in turn, fluidly connected to each individual fuel injector 36 in a known manner.

The natural gas fuel supply system 40 may include an insulated tank 50 for storing the natural gas fuel in a liquefied state, and a pressure sensor 52 positioned to measure fluid pressure within the insulated tank 50. A high-pressure pump 54 is positioned at least partially within the insulated tank 50 for drawing the natural gas fuel from the insulated tank 50. The high-pressure pump 54 pumps the liquefied natural gas fuel from the insulated tank 50 to a heat exchanger 60. The heat exchanger 60 transfers heat into the liquefied natural gas fuel to change, or vaporize, the liquefied natural gas fuel into a gaseous state. Under pressure of the high-pressure pump 54, natural gas fuel in the gaseous state is transferred from the heat exchanger 60 to an accumulator 62, or other reservoir. The gaseous natural gas fuel may also pass through a high pressure gas filter 64 before passing through a fuel conditioning module 66 and into a gaseous fuel common rail 68. The gaseous fuel common rail 68 is also fluidly connected to the individual fuel injectors 36 in a known manner.

To diagnose problems with the dual fuel system 34, an electronic controller 70 of the machine 10 may execute a cryogenic system diagnostics algorithm 90 thereon. According to the cryogenic system diagnostics algorithm 90, the electronic controller 70 receives a pressure signal 76 from the pressure sensor 52, detects a cryogenic system fault based on the pressure signal 76, and generates a notification signal 78 based on the cryogenic system fault. In particular, the electronic controller 70 may calculate a pressure change rate 118 based on the pressure signal 76, compare the pressure change rate 118 to a baseline pressure change rate 116 stored in memory 74, and generate the notification signal 78 if the pressure change rate 118 is greater than an acceptable deviation 120 of the baseline pressure change rate 116.

The disclosed cryogenic system diagnostic algorithm detects problems with one or both of the cryogenic pump and insulated tank by comparing a measured pressure rise rate in the cryogenic tank to a baseline, or expected, pressure rise rate. By detecting problems with the cryogenic fuel system early, or at least before the problem progresses to component failure, an operator can schedule replacement or repair of the faulty component at a convenient time and avoid costly machine downtime that might otherwise occur.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:
1. A machine, comprising:
a machine body;
a dual fuel compression ignition engine attached to the machine body and having a plurality of cylinders;
a dual fuel system operably coupled to supply the dual fuel compression ignition engine with liquid diesel fuel and natural gas fuel directly into a respective one of the plurality of cylinders, wherein the dual fuel system comprises:

an insulated tank for storing the natural gas fuel in a liquefied state;
a pressure sensor positioned at least partially within the insulated tank to measure fluid pressure within the insulated tank; and
a pump for drawing the natural gas fuel from the insulated tank; and
an electronic controller in communication with the pressure sensor and having a cryogenic system diagnostics algorithm executable thereon, wherein the controller is configured to:
receive a pressure signal from the pressure sensor;
calculate a pressure change rate based on the pressure signal;
compare the pressure change rate to a baseline pressure change rate;
detect a cryogenic system fault based on the pressure signal, wherein the fault occurs if the pressure change rate deviates from the baseline pressure change rate by a predetermined amount;
generate a notification signal based on the detected cryogenic system fault; and
if there is a change in a load factor value, then adjust at least one of the pressure change rate or the baseline pressure change rate.

2. The machine of claim 1, wherein the pressure change rate and the baseline pressure change rate correspond to pressure increases.

3. The machine of claim 2, wherein a user notification indicating a problem with the pump is generated responsive to the notification signal.

4. The machine of claim 2, wherein a user notification indicating a problem with the insulated tank is generated responsive to the notification signal.

5. The machine of claim 1, wherein the machine body is supported by a conveyance, and the dual fuel compression ignition engine is operably coupled to the conveyance.

6. The machine of claim 1, wherein the pump is positioned at least partially within the insulated tank.

7. A machine, comprising
a machine body;
a dual fuel compression ignition engine attached to the machine body and having a plurality of cylinders;
a dual fuel system operably coupled with the dual fuel compression ignition engine, wherein the dual fuel system comprises:
an insulated tank for storing natural gas fuel in a liquefied state;
a pressure sensor positioned to measure fluid pressure within the insulated tank; and
a pump; and
an electronic controller in communication with the pressure sensor and having a cryogenic system diagnostics algorithm executable thereon, the electronic controller executes the steps of:
drawing the natural gas fuel from the insulated tank using the pump;
supplying the dual fuel compression ignition engine with liquid diesel fuel and the natural gas fuel directly into a respective one of the plurality of cylinders; and
executing the cryogenic system diagnostics algorithm, wherein the executing step includes:
receiving a pressure signal from the pressure sensor;
calculating a pressure change rate based on the pressure signal;
comparing the pressure change rate to a baseline pressure change rate;
detecting a cryogenic system fault based on the pressure signal, wherein the fault occurs if the pressure change rate deviates from the baseline pressure change rate by a predetermined amount;
generating a notification signal based on the detected cryogenic system fault; and
if there is a change in a load factor value, then adjusting at least one of the pressure change rate or the baseline pressure change rate.

8. The machine of claim 7, further including generating a user notification indicating a problem with the pump responsive to the notification signal.

9. The machine of claim 7, further including generating a user notification indicating a problem with the insulated tank responsive to the notification signal.

10. A machine, comprising:
a machine body;
a dual fuel compression ignition engine coupled to the machine body, and having a plurality of cylinders;
a dual fuel system operably coupled to supply the dual fuel compression ignition engine with liquid diesel fuel and natural gas fuel directly into a respective one of the plurality of cylinders, wherein the dual fuel system comprises:
an insulated tank that stores the natural gas fuel;
a pressure sensor positioned at least partially within the insulated tank to measure a fluid pressure within the insulated tank; and
a pump that draws the natural gas fuel from the insulated tank; and
an electronic controller in communication with the pressure sensor and having a cryogenic system diagnostics algorithm executable thereon and stored in a memory, wherein the electronic controller is configured to:
receive a pressure signal from the pressure sensor;
detect a cryogenic system fault based on the pressure signal, the fault occurs if a pressure change rate deviates from a baseline change rate by a predetermined amount;
generate a user notification signal based on the detected cryogenic system fault; and
adjust at least one of the pressure change rate and the baseline pressure change rate based on a load factor value.

11. The machine of claim 10, wherein the load factor value is an engine operating condition.

12. The machine of claim 10, wherein the user notification signal is displayed on an operator's display.

13. The machine of claim 10, wherein the user notification signal indicates a problem with the insulated tank.

14. The machine of claim 10, wherein the user notification signal indicates a problem with the pump.

15. The machine of claim 10, wherein the pressure change rate and the baseline pressure change rate correspond to pressure increases.

* * * * *